US012546431B2

(12) United States Patent
Taylor

(10) Patent No.: US 12,546,431 B2
(45) Date of Patent: Feb. 10, 2026

(54) ROTATING MOTOR MOUNT APPARATUS

(71) Applicant: Shuttle Slide, LLC, Roseland, FL (US)

(72) Inventor: Russell Taylor, Micco, FL (US)

(73) Assignee: SHUTTLE SLIDE, LLC, Roseland, FL (US)

( * ) Notice: Subject to any disclaimer, the term of this patent is extended or adjusted under 35 U.S.C. 154(b) by 184 days.

(21) Appl. No.: 18/631,923

(22) Filed: Apr. 10, 2024

(65) Prior Publication Data

US 2025/0320951 A1 Oct. 16, 2025

(51) Int. Cl.
*F16M 5/00* (2006.01)
*B63H 21/30* (2006.01)

(52) U.S. Cl.
CPC ............... *F16M 5/00* (2013.01); *B63H 21/30* (2013.01)

(58) Field of Classification Search
CPC ........ F16M 5/00; B63H 21/30; B63H 20/007; B63H 20/06; B63H 20/02
See application file for complete search history.

(56) References Cited

U.S. PATENT DOCUMENTS

| | | | | |
|---|---|---|---|---|
| 2,488,199 A * | 11/1949 | Jordan | B63H 20/06 | 440/52 |
| 4,820,208 A * | 4/1989 | Phillips, Sr. | B63H 20/007 | 440/62 |
| 5,088,943 A * | 2/1992 | Henderson | B63H 20/007 | 440/6 |
| 5,152,703 A * | 10/1992 | Clement | B63H 20/007 | 74/480 B |
| 5,439,401 A * | 8/1995 | Clark | B63H 20/12 | 440/60 |
| 6,213,821 B1 * | 4/2001 | Bernloehr | B63H 20/106 | 440/59 |
| 7,004,804 B2 * | 2/2006 | Bernloehr | B63H 20/007 | 248/642 |
| 7,455,558 B2 * | 11/2008 | Yander | B63H 20/007 | 440/63 |
| 9,248,897 B2 * | 2/2016 | Shields | B63H 20/06 | |
| 10,689,081 B2 * | 6/2020 | Shields | B63H 20/007 | |
| 11,279,457 B1 * | 3/2022 | Craft | B63H 20/06 | |
| 11,305,855 B1 * | 4/2022 | Payne | B63H 20/06 | |
| 11,939,036 B2 * | 3/2024 | Perdomo Tornbaum | B63H 21/30 | |
| 2003/0024456 A1 * | 2/2003 | Swetish | B63H 20/007 | 114/144 R |
| 2024/0034450 A1 * | 2/2024 | Choi | B63H 20/06 | |

* cited by examiner

*Primary Examiner* — Eret C Mcnichols
(74) *Attorney, Agent, or Firm* — Kelly G. Swartz; Widerman Malek, PL

(57) ABSTRACT

A motor mount apparatus including a mounting member, a platform member that includes a proximal platform section including a proximal aperture and an indexing member aperture, and a distal platform section configured to facilitate attachment of at least one of a motor or a motor mounting device thereto. The apparatus further includes a wheel member positioned within the proximal aperture, attached to the mounting member to prevent relative rotation therebetween, and including a plurality of indexing recesses. The apparatus further includes an indexing member that can pass through the indexing member aperture and be positioned within an indexing recess of the plurality of indexing recesses and selectively retract to permit rotation of the platform member about the wheel member and be positioned in another index recess of the plurality of indexing recesses.

20 Claims, 7 Drawing Sheets

ROTATING MOTOR MOUNT APPARATUS

FIELD OF THE INVENTION

The present invention relates to an apparatus for rotatably mounting motors.

BACKGROUND OF THE INVENTION

Mounting of motors in many contexts has often required motors be mounted at a relatively fixed angle relative to the structure to which the motor is mounted. Particularly in the context of boating, there is a greater need for the ability to rotate a mounted motor, such as a trolling motor, relative to the boat to which the motor is mounted. Moreover, while previous solutions enable rotation of the motor about an axis that passes through the motor, there is a need in the art for a motor mount that allows a user to rotate the motor about an axis further removed from a central axis of the motor.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a motor mount apparatus comprising a mounting member configured to be fixedly attached to an external structure, a platform member comprising a proximal platform section that comprises a proximal aperture and an indexing member aperture, and a distal platform section configured to facilitate attachment of at least one of a motor or a motor mounting device thereto. The motor mount apparatus further comprises a wheel member positioned within the proximal aperture, attached to the mounting member to prevent relative rotation therebetween, and comprising a plurality of indexing recesses and an indexing member configured to: pass through the indexing member receive aperture and be positioned within an indexing recess of the plurality of indexing recesses and selectively retract to permit rotation of the platform member about the wheel member and be positioned in another index recess of the plurality of indexing recesses.

In some embodiments, the plurality of indexing recesses may be formed in a perimeter of the wheel member. In some embodiments, the plurality of indexing recesses may be formed in a semicircle of the wheel member. In some embodiments, the plurality of indexing recesses may define a plurality of interstitial regions between adjacent indexing recesses of the plurality of indexing recesses, and an arc length of at least one interstitial region of the plurality of interstitial regions is not equal to an arc length of another interstitial region of the plurality of interstitial regions.

In some embodiments, the wheel member may comprise a first plurality of fastener apertures, the mounting member may comprise a second plurality of fastener apertures configured to be radially aligned with the first plurality of fastener apertures; and the motor mount apparatus may further comprise a plurality of fasteners configured to be positioned through aligned apertures of the first and second pluralities of fastener apertures, thereby fastening the wheel member to the mounting member. In further embodiments, the motor mount apparatus may further comprise an upper member configured to be positioned above the wheel member and comprising a third plurality of fastener apertures configured to be radially aligned with the first and second pluralities of fastener apertures. The plurality of fasteners may be configured to be positioned through the aligned apertures of the first, second, and third pluralities of fastener apertures, thereby fastening the wheel member and the upper member to the mounting member. The motor mount apparatus may further comprise a gasket member positioned between the wheel member and the upper member.

In some embodiments, the wheel member may be configured to be reversible such that in a first orientation a first surface is positioned facing upwards and in a second orientation the first surface is positioned facing downwards. In some embodiments, the motor mount apparatus may further comprise a gasket member positioned between the mounting member and the wheel member.

In some embodiments, the motor mount apparatus may further comprise a motor mounting device attached to the distal platform section. The motor mounting device may comprise an elongate base member attached to an upper surface of the distal platform section and comprising opposing slots formed along a length of elongate sides of the elongate base member and at least two sliding members, each sliding member being positioned at least partially within one of the opposing slots and being configured to slide along the length of the elongate slot within which the sliding member is partially positioned, thereby establishing a slidable attachment between the sliding members and the elongate base member, each sliding member comprising an upper flange member configured to facilitate attachment of a motor to the motor mounting device. The slidable attachment of the at least two sliding members may enable a motor mounted thereto to slide along a longitudinal axis of the motor mounting device.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
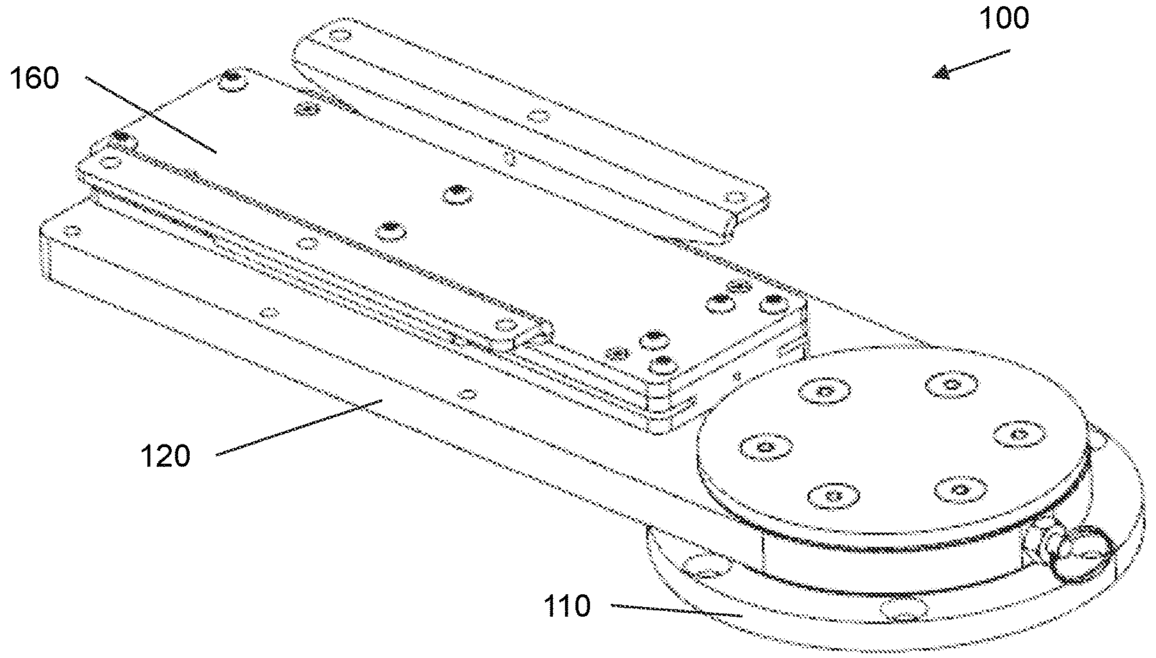
FIG. 1 is a perspective view of a motor mount apparatus according to an embodiment of the present invention.
Figure 2:
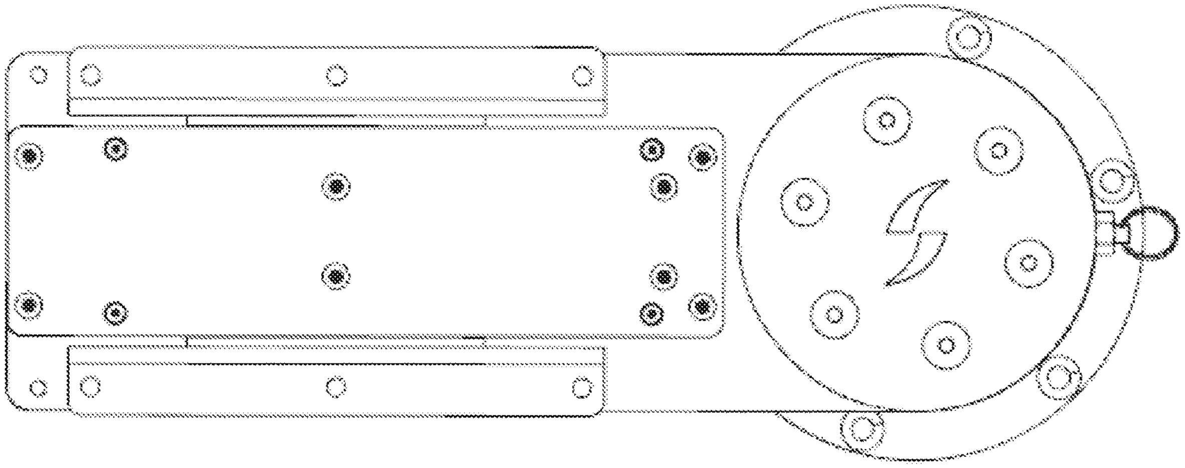
FIG. 2 is a top view of the motor mount apparatus of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

It is further contemplated that, where it is described below that fasteners may be employed, a motor mount apparatus according to the invention may comprise such fasteners.

An embodiment of the invention, as shown and described by the various figures and accompanying text, provides a motor mount apparatus that is operable to rotate a motor mounted thereon. The axis of rotation may be at a distance from the portion of the motor mount apparatus upon which the motor is mounted. The motor mount apparatus may be configured to permit the motor to be rotated without needing any disassembly of the apparatus. Additionally, the motor mount apparatus may be configured to permit the motor to be positioned in one of several angular orientations and retained in that orientation until changed by a user.

Referring now to FIGS. 1-8, various aspects of a motor mount apparatus 100 according to an embodiment of the invention are presented. The motor mount apparatus 100 may comprise a mounting member 110, a platform member 120, a wheel member 140, and a motor mounting device 160.

Figure 3:
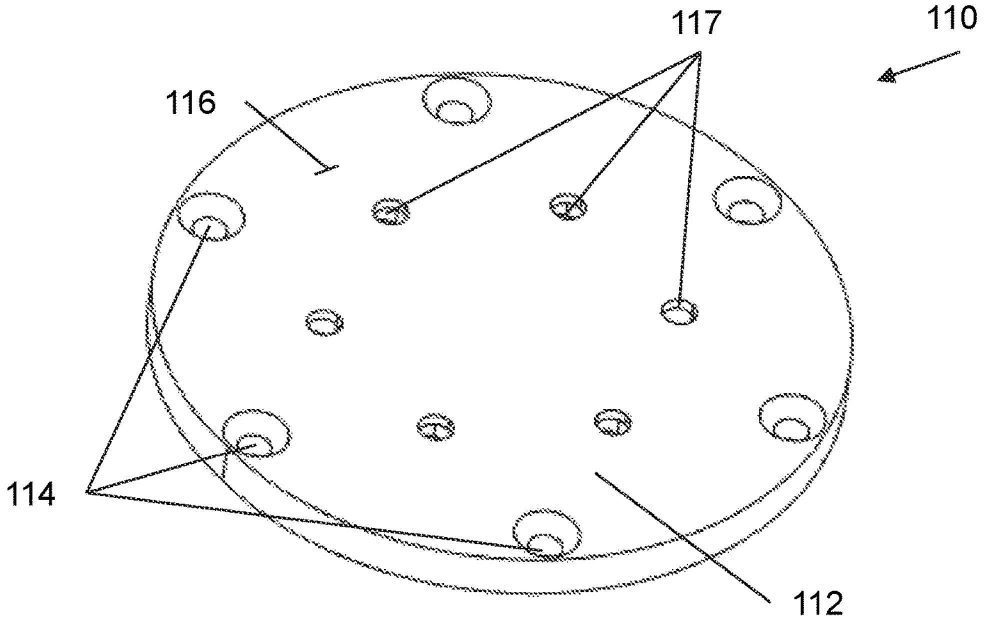
FIG. 3 is a perspective view of a mounting member of the motor mount apparatus of FIG. 1.

Referring now specifically to FIG. 3, additional details about the mounting member 110 will be discussed. The mounting member 110 may be configured to fixedly attach the motor mount apparatus 100 to an external structure. Such an external structure may be a structure within the environment to which the apparatus 100 may be attached and enable rotation of a motor mounted thereto. Such structures include, but are not limited to, portions or a water vessel, including transoms, bows, sterns, and any other part of the hull. Other structures include railings, half walls, and other structures that may permit the apparatus 100 to be attached to an upper portion thereof and allow rotation of a mounted motor as described below.

The mounting member 110 may comprise a body member 112. The body member 112 may have any geometry as may be used to accomplish the above-described attachment. While the body member 112 of the present embodiment is circular, it is contemplate and included within the scope of the invention that the body member 112 may be square, rectangular, elliptical, ovular, triangular, trapezoidal, in the shape of any parallelogram, and any other regular or non-regular geometric shape.

The mounting member 110 may comprise one or more structural features configured to facilitate the attachment of the mounting member to the external structure as described above. In the present embodiment, the mounting member 110 may comprise a first plurality of apertures 114 within the body member 112. The first plurality of apertures 114 may be positioned and configured to facilitate the positioning of fasteners therethrough to facilitate attachment of the mounting member 110 to the external structure. In the present embodiment, the first plurality of apertures 114 are countersunk on an upper surface 116 of the body member 112. The first plurality of apertures 114 may be distributed about a perimeter of the body member 112.

Figure 4:
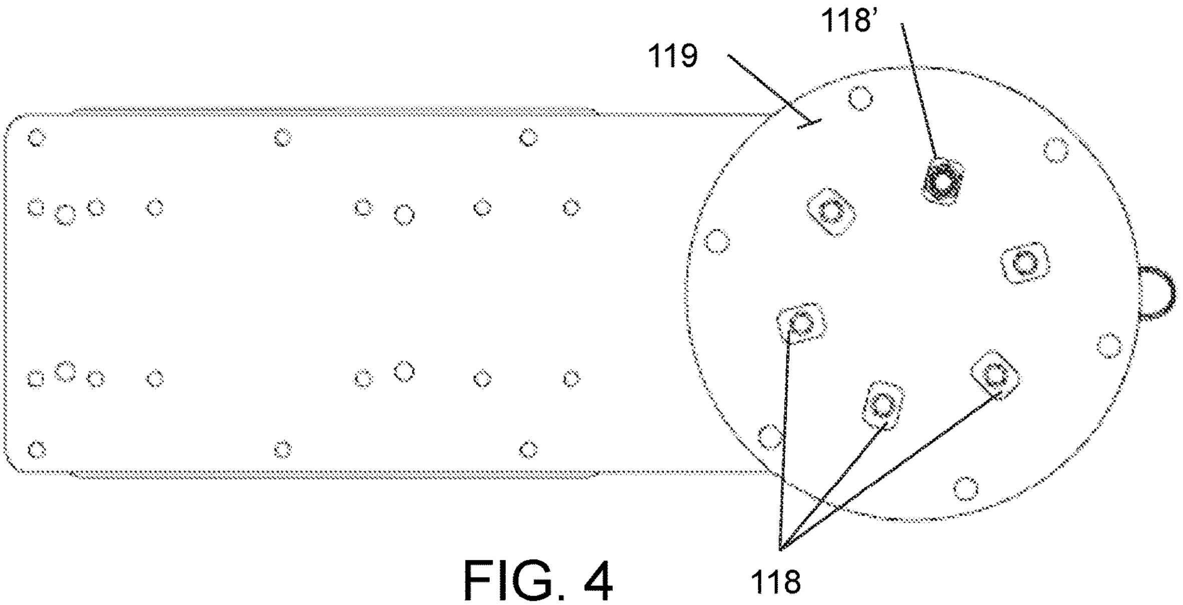
FIG. 4 is a bottom view of the motor mount apparatus of FIG. 1.

The mounting member 110 may further comprise one or more structures configured to facilitate attachment of one or more of the other parts of the motor mount apparatus 100 to the mounting member 110. In the present embodiment, the mounting member 110 comprises a second plurality of apertures 117 formed in the body member 112. The second plurality of apertures 117 may be evenly spaced about a center axis of the body member 112 radially inward from the first plurality of apertures 114. The second plurality of apertures 117 may be configured to permit fasteners to pass therethrough to facilitate attachment of one or more of the other parts of the motor mount apparatus 100 to the mounting member 110. As shown in FIG. 4, recessed sections 118 may be formed in a lower surface 119 of the body member 112. The recessed sections 118 may facilitate the positioning of part of the fastener to be positioned therein, as shown in recess 118'. This may enable the mounting member 110 to be flush mounted on the external surface to which it is attached without the fasteners passing through the apertures of the second plurality of apertures 117 preventing such flush mounting.

Figure 5:
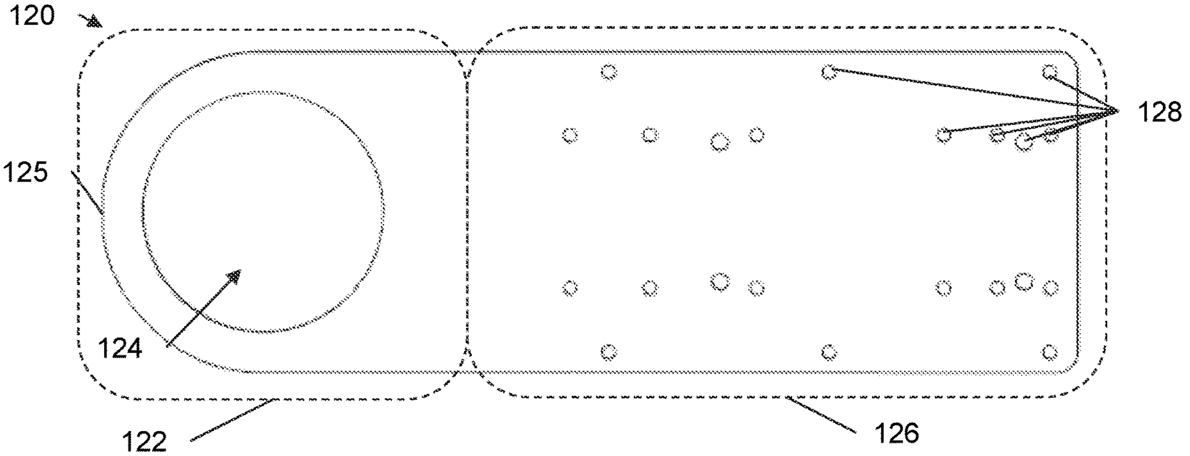
FIG. 5 is a top view of a platform member of the motor mount apparatus of FIG. 1.
Figure 6:
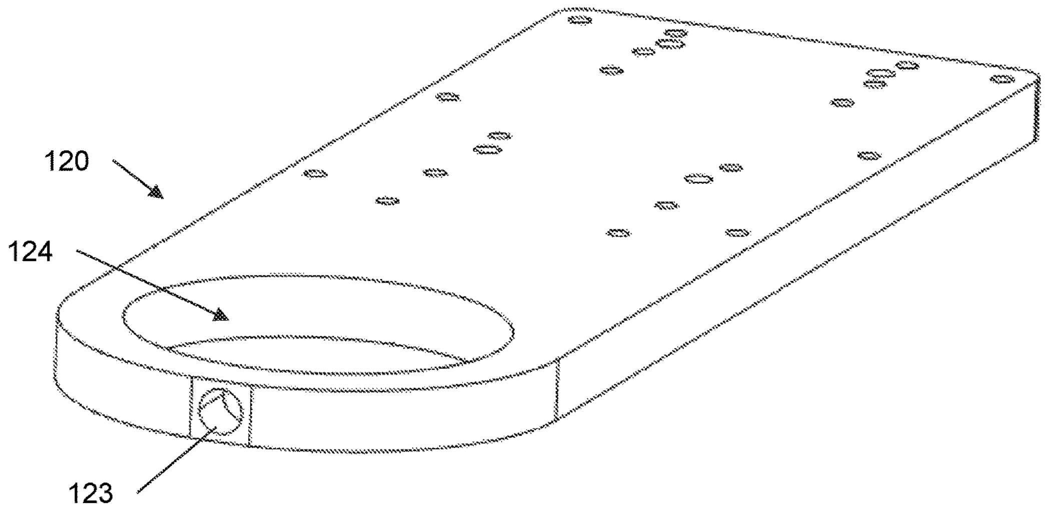
FIG. 6 is a perspective view of the platform member of FIG. 5.

Referring now specifically to FIGS. 5-6, the platform member 120 of the motor mount apparatus 100 will be discussed in greater detail. The platform member may comprise a proximal platform section 122 and a distal platform section 126. The proximal platform section 122 may comprise a proximal aperture 124. The proximal aperture 124 may be configured to permit the wheel member 140 to be positioned therewithin. Accordingly, the proximal aperture 124 may have a geometry configured to conform to the shape of the wheel member 140. In the present embodiment, where the wheel member 140 is circular, the proximal aperture 124 is similarly circular. Any respective shapes of the wheel member 140 and the proximal aperture 124 are contemplated and included within the scope of the invention.

The proximal platform section 122 may have a thickness that is approximately equal to or greater than a height of the wheel member 140. The proximal platform section 122 may further comprise a proximal end 125 having a shape configured to conform to the shape of the mounting member 110. In the present embodiment, the proximal end 125 is semi-circular, thereby conforming to the circular shape of the mounting member 110.

The proximal platform section 122 may further comprise an indexing member aperture 123. The indexing member aperture 123 may be configured to permit an indexing member to be positioned therethrough and engage with the wheel member 140, as described in greater detail below. The indexing member aperture 123 may be formed in the proximal end 125 and connect to the proximal aperture 124 such that an indexing member passing therethrough may enter the proximal aperture 124. The indexing member aperture 123 may be shaped to conform to the shape of the indexing member, including any regular or non-regular shape. In the present embodiment, the indexing member aperture 123 is circular.

The distal platform section 126 may be configured to facilitate the mounting of a motor thereto. In some embodiments, the distal platform section 126 may be configured to facilitate the attachment of a device thereto, such as the motor mounting device 160, to which a motor may then be mounted. The distal platform section 126 may comprise a plurality of apertures 128 configured to facilitate the attachment of at least one of a motor and the motor mounting device 160.

The distal platform section 126 may have a thickness that is equal to the thickness of the proximal platform section 122. The thickness and material from which the distal platform section 126 is formed may be of sufficient strength and/or resilience to prevent plastic deformation and/or an undesirable amount of flexure when a motor and/or the motor mounting device 160 are attached thereto, the motor mount apparatus 100 is attached to an external structure, and the attached motor is operating.

In some embodiments, the proximal and distal platform sections 122, 126 may be integrally formed as a single monolithic structure. In some embodiments, one or more of the proximal and distal platform sections 122, 126 may be formed from a metal, a metal alloy, carbon fiber, a polymer, a composite material, and the like. In some embodiments, one or more of the proximal and distal platform sections 122, 126 may be formed by at least one of casting, additive manufacturing, milling, and/or any other fabrication mode/method as is known in the art.

Figure 7:
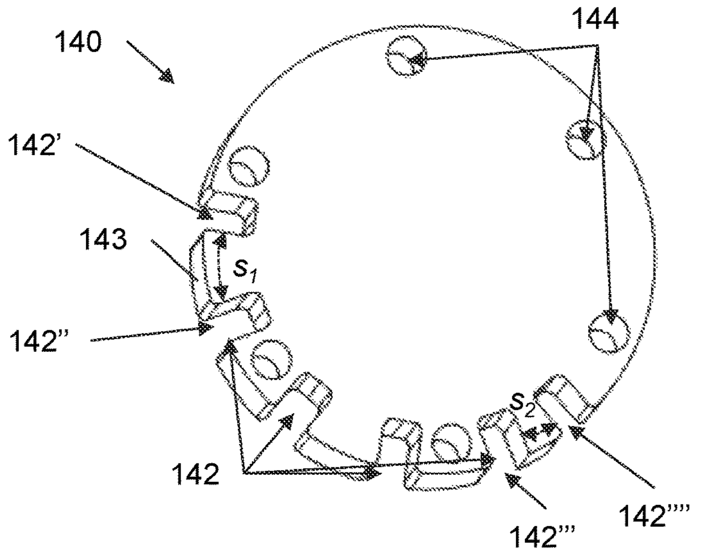
FIG. 7 is a perspective view of a wheel member of the motor mount apparatus of FIG. 1.
Figure 8:
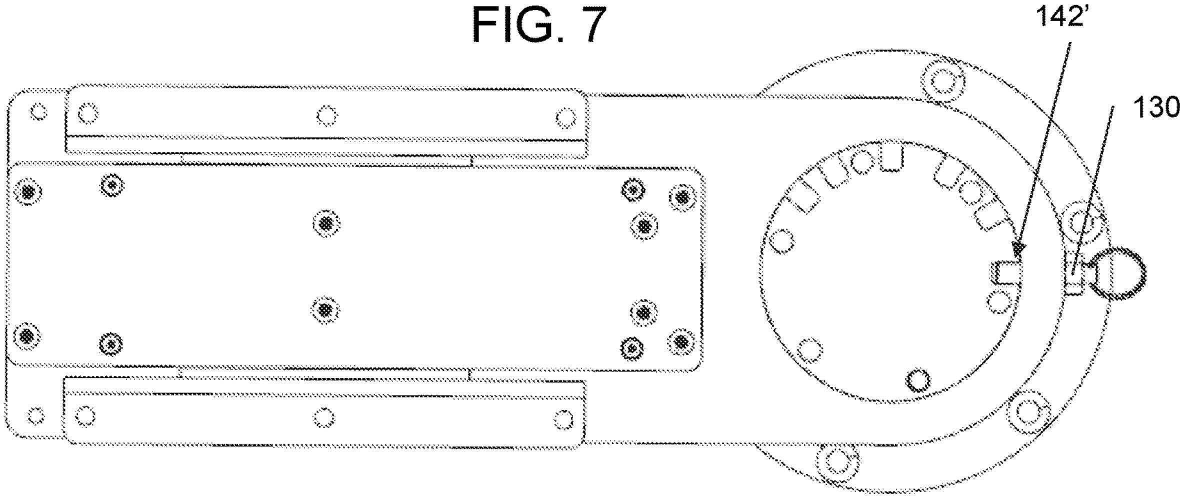
FIG. 8 is a top view of the motor mount apparatus of FIG. 1 with an upper member thereof removed.
Figure 9:
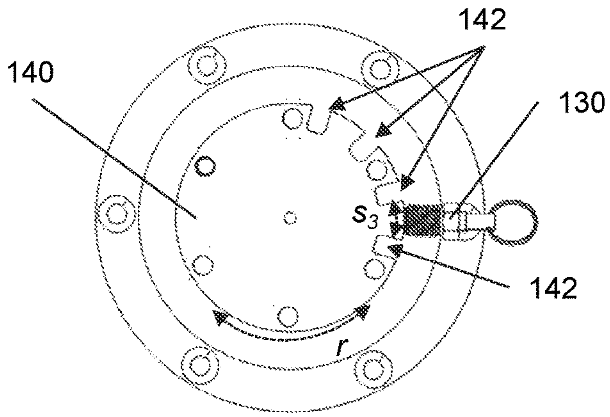
FIG. 9 is a top view of the wheel member, mounting member, and an indexing member of the motor mount apparatus of FIG. 1.

Referring now to FIGS. 7-9, aspects of the wheel member 140 will now be discussed in greater detail. The wheel member 140 may be configured to be positioned within the proximal aperture 124 of the platform member 120. The wheel member 140 may further be configured to interface with an indexing member positioned through the indexing member aperture 123 of the platform member 120. An embodiment of an indexing member 130 is presented in FIG. 8. Such interfacing may prevent or limit the rotation of the platform member 120 relative to the wheel member 140.

The wheel member 140 may comprise a plurality of indexing recesses 142. The plurality of indexing recesses 142 may be configured to permit the indexing member 130 to extend therein. When positioned within an indexing recess of the plurality of indexing recesses 142, as shown at 142' in FIG. 8, the indexing member 130 may interface with the wheel member 140, specifically portions of a sidewall 143 of the wheel member 140 that define the indexing recess 142' within which the indexing member 130 is positioned. If the wheel member 140 is attempted to be rotated, the indexing member 130 may be resisted by the platform member 120 by virtue of also simultaneously being positioned through the indexing member aperture 123. Accordingly, through such resistance, the interfacing of the indexing member 130 with the sidewall 143 defining the indexing recess 142' may prevent and/or limit the rotation of the wheel member 140 relative to the platform member 120.

The plurality of indexing recesses 142 may be formed so as to extend radially inward from the perimeter of the wheel member 140. Owing to the horizontal orientation of the axis of the indexing member aperture 123 and the traversal of the indexing member 130 to enter into and interface with an indexing recess of the plurality of indexing recesses 142, the plurality of recesses may be formed in this manner instead of being milled from the body of the wheel member 140. Accordingly, the wheel member 140 may be fabricated to include the plurality of indexing recesses 142 as part of the initial fabrication process. The wheel member 140 may be formed of cast metal, where the wheel member 140 is cast to include the plurality of indexing recesses 142 without additional removal of material from the body of the wheel member 140, aside from finishing.

The plurality of indexing recesses 142 may be distributed about at least a portion of the perimeter of the wheel member 140. In the present embodiment, one half of the perimeter (semicircle) of the wheel member 140 comprises all of the indexing recesses of the plurality of indexing recesses 142 and another semicircle of the perimeter of the wheel member 140 comprises none. It is contemplated and included within the scope of the invention that the plurality of indexing recesses 142 may be limited to one-third of the perimeter of the wheel member 140, one-quarter of the perimeter of the wheel member 140, two-thirds of the perimeter of the wheel member 140, three-quarters of the perimeter of the wheel member 140, or not be limited and be distributed about the entire perimeter.

The interstitial regions between adjacent indexing recesses of the plurality of indexing recesses may be regular or irregular. In the present embodiment, a first interstitial region $s_1$ between adjacent indexing recesses 142', 142" may be a first arc length and a second interstitial region $s_2$ between adjacent indexing recesses 142'" 142" may be a second arc length. The arc length of $s_1$ may be different from the arc length of $s_2$. The arc length of $s_1$ may be greater than or less than the arc length of $s_2$. It is contemplated and included within the scope of the invention that the wheel member 140 may comprise any number of interstitial regions $s_n$ and those interstitial regions may have an arc length that is different from the arc length of one or more of the other interstitial regions.

It is further contemplated and included within the scope of the invention that the wheel member 140 may be reversible, i.e. may be flipped over to change the sequence of the plurality of indexing recesses 142 and attending interstitial regions as one goes around the perimeter of the wheel member 140. Such reversing may be accomplished by detaching at least an upper member and upper gasket (described in greater detail below) from the motor mount apparatus 100, removing the wheel member 140 from the proximal aperture 124, reversing it such that a surface that was facing upwards now faces downwards, replacing the wheel member 140 into the proximal aperture 124, and reattaching the upper gasket and upper member.

The wheel member 140 may further comprise a plurality of fastener apertures 144. The plurality of fastener apertures 144 may be configured to align with the second plurality of apertures 117 of the mounting member 110. Accordingly, as fastener positioned through an aperture of the plurality of fastener apertures 144 may also be positioned through a coaxial aperture of the second plurality of apertures 117. As the mounting member 110 is fixedly attached to an external structure, the positioning of fasteners through the apertures of the plurality of fastener apertures 144 and the second plurality of apertures 117 may prevent and/or restrict relative rotation between the wheel member 140 and the mounting member 110. This has the concordant effect of preventing relative rotation between the platform member 120 and the mounting member 110 when the indexing member 130 is positioned within an indexing recess of the plurality of indexing recesses 142.

In some embodiments, the plurality of indexing recesses 142 may be configured to prevent the unintentional removal of the indexing member 130 from therewithin. In some of such embodiments, the plurality of indexing recesses may comprise one or more features configured to engage with one or more features of the indexing member 130. Types of such features include, but are not limited to, threads, ridges, grooves, catches, being formed of a magnetic or ferromagnetic material configured to attract the indexing member 130, and the like.

As shown in FIG. 9, the indexing member 130 may be retracted by a user such that no portion thereof is positioned within an indexing recess of the plurality of indexing recesses 142. In such a retracted condition, the wheel member 140 may be rotated unrestricted by the indexing member 130, including where the wheel member 140 is in a rotational area where an interstitial region $s_3$ between adjacent indexing recesses of the plurality of indexing recesses 142 engages with the indexing member 130 and prevents the indexing member 130 from entering into the proximal aperture 124. When in the retracted condition, the wheel member 140 may be rotated as indicated by path r until an indexing recess of the plurality of indexing recesses 142 is positioned in alignment with the indexing member 130 that positions the platform member 120 in a desired rotational orientation. When so positioned, the indexing member 130 may be transitioned into an extended condition, where the indexing member extends into an indexing recess of the plurality of indexing recesses 142, thereby preventing unintended rotation of the platform member 120.

Figure 10A:
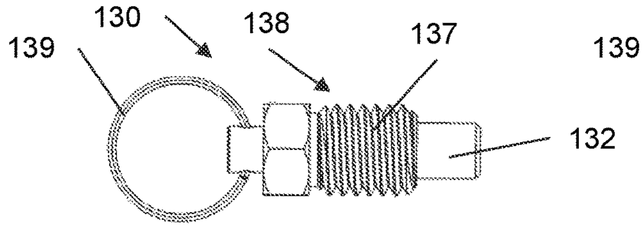
FIGS. 10A-B are views of the indexing member of the motor mount apparatus of FIG. 1.
Figure 10B:
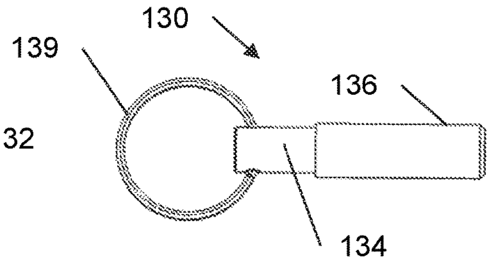

Referring now to FIGS. 10A-10B, additional aspects of the indexing member 130 will be discussed in greater detail. The indexing member 130 may comprise a shaft member 132 and a user engagement member 138. The shaft member 132 may be configured to be retractable as described hereinabove. The shaft member 132 may comprise a proximal section 134 a distal platform section 136 and biasing means (not shown) configured to bias the shaft member 132 into an extended configuration, where the distal platform section 136 may extend into an indexing recess as described above. The user engagement member 138 may be configured to facilitate a user retracting the distal platform section 136 to transition the indexing member 130 into a retracted configuration, where the distal platform section 136 does not extend into an indexing recess as described above. Any structure, means, or method of such a user engagement member 138 is contemplated and included within the scope of the invention. In the presented embodiment, the user engagement member 138 comprises a hollow bolt 137 positioned around and attached to the shaft member 132 and a pull ring 139 attached at a proximal end of the shaft member 132.

Figure 11:
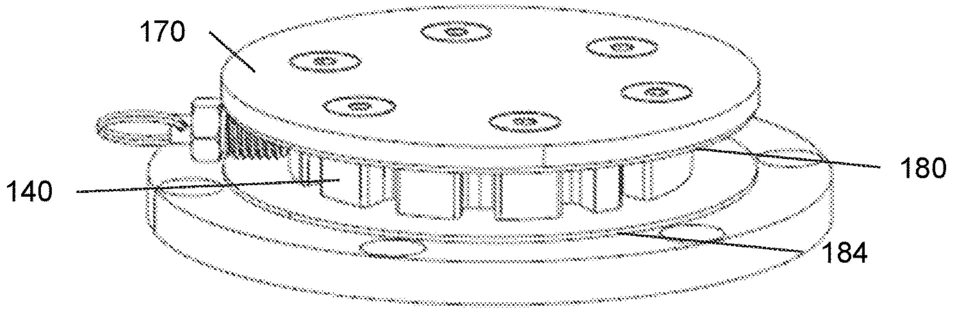
FIG. 11 is a perspective view of the upper member, wheel member, upper and lower gasket members, indexing member, and mounting member of the motor mount apparatus of FIG. 1.
Figure 12A:
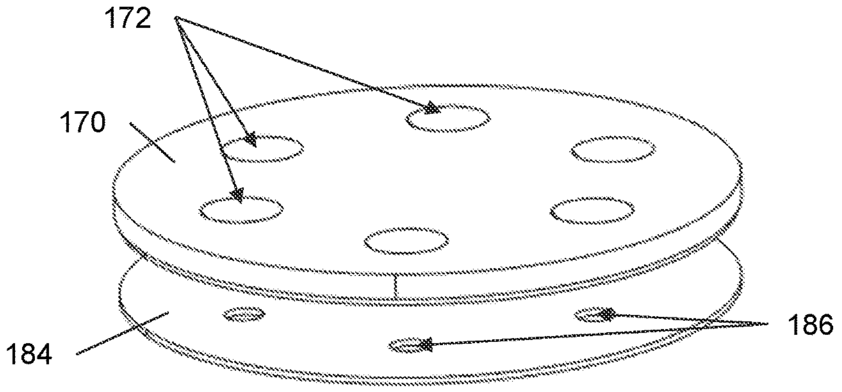
FIGS. 12A-B are upper and lower perspective views of the upper member, upper gasket, and lower gasket of the motor mount apparatus of FIG. 1.
Figure 12B:
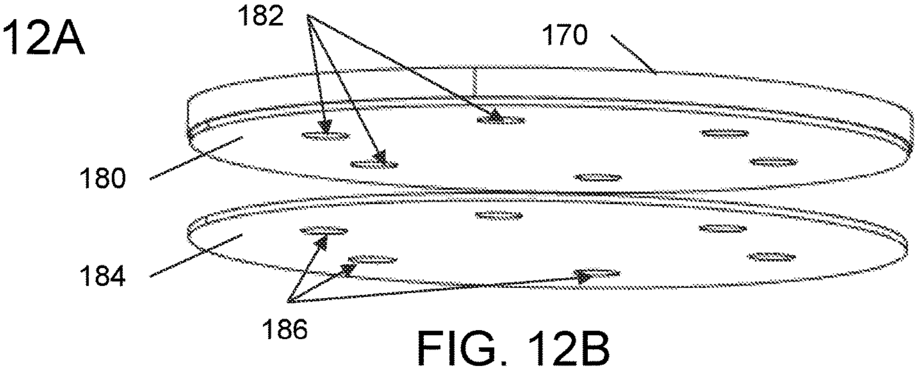
Figure 13:
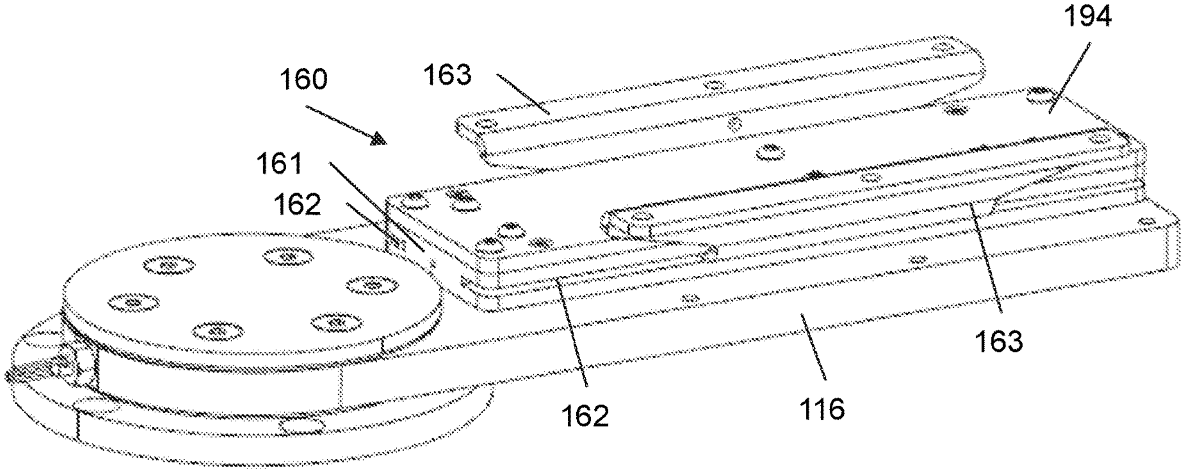
FIG. 13 is another perspective view of the motor mount apparatus of FIG. 1.
Figure 14:
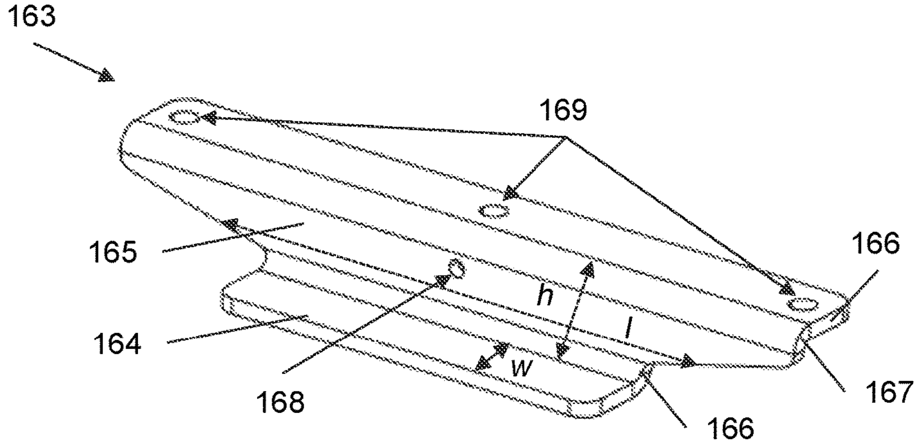
FIG. 14 is a perspective view of a sliding member of the motor mount apparatus of FIG. 1.
Figure 15:
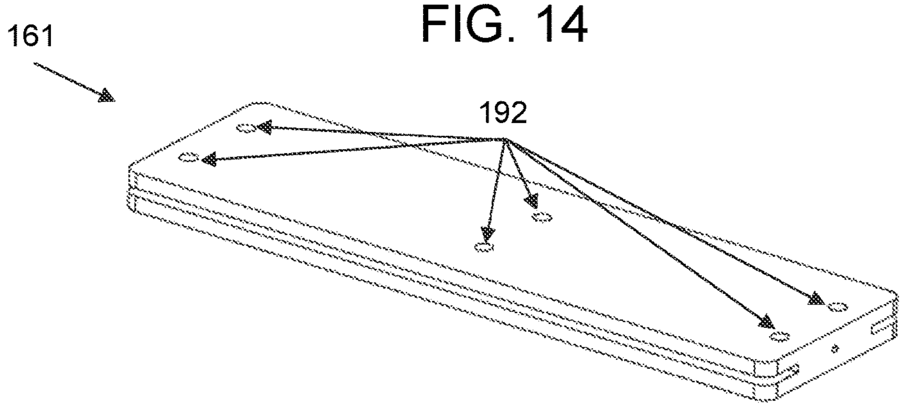
FIG. 15 is a perspective view of an elongate base member of the motor mount apparatus of FIG. 1.
Figure 16:
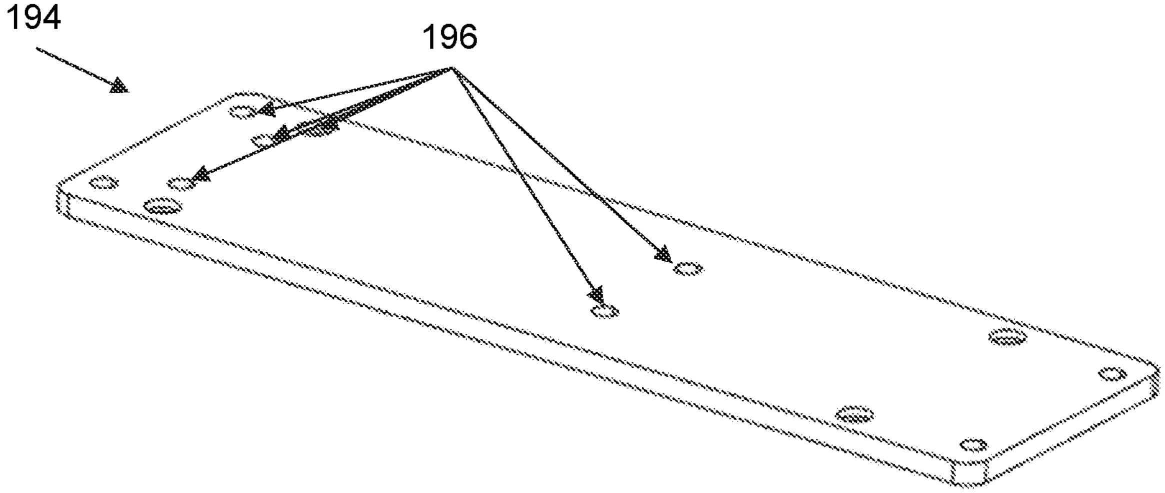
FIG. 16 is a perspective view of an elongate cover member of the motor mount apparatus of FIG. 1.

Referring now to FIGS. 11-12B, an upper member 170 and a pair of gaskets 180, 184 comprised by the motor mount apparatus 100 of the present embodiment will be discussed. The upper member 170 may be positioned generally above the wheel member 140 and comprise a plurality of upper fastener apertures 172. The plurality of upper fastener apertures 172 may be configured to align and be coaxial with the plurality of fastener apertures 144 of the wheel member 140. Accordingly, fasteners may be positioned to pass through each aperture of the plurality of upper fastener apertures 172 as well as each aperture of each of the plurality of fastener apertures 144 and the second plurality of apertures 117 of the mounting member 110, thereby preventing relative rotation and relative vertical translation between each of the mounting member 110, the wheel member 140, and the upper member 170. In the present embodiment, the plurality of upper fastener apertures 172 are countersunk, but other embodiments may comprises apertures that are not countersunk.

An upper gasket 180 may be positioned between the upper member 170 and the wheel member 140. The upper gasket 180 may be configured to at least one of prevent damage to the upper member 170 and/or the wheel member 140 from the other or avoid liquid and/or fluid intrusion into the proximal aperture 124. Similarly, a lower gasket 184 may be positioned between the wheel member 140 and the mounting member 110 and may be configured to at least one of prevent damage to the wheel member 140 and/or the mounting member 110 from the other or avoid liquid and/or fluid intrusion into the proximal aperture 124. Each of the upper and lower gaskets 180, 184 may comprise a plurality of gasket fastener apertures 182, 186 configured to align and be coaxial with the plurality of upper fastener apertures 172 of the upper member 170 and the plurality of fastener apertures 144 of the wheel member 140.

Referring now to FIGS. 13-16, a motor mounting device 160 according to an embodiment of the invention the presented. The motor mounting device 160 may comprise an elongate base member 161 that may be fixedly attached to the distal platform section 126 of the platform member 120. The elongate base member 161 may comprise a pair of opposing slots 162 formed along a length of the elongated sides of the elongate base member 161.

The motor mounting device 160 may further comprise at least two sliding members 163. Each sliding member 163 may be configured to be positioned at least partially within one of the slots 162. Each sliding member 163 may comprise a lower flange section 164, an intermediate section 165, and an upper flange section 166. The lower flange section 164 may be configured to be inserted into the slots 162 of the elongated base member 161. In some embodiments, the lower flange section 164 may comprise one or more structural features configured to prevent the unintentional removal of the sliding member 163 from the slots 162. Examples of such features include, but are not limited to, ridges, magnetic or ferromagnetic materials, and the like. In some embodiments, the width w of the lower flange section 164 may prevent the sliding member 163 from rotating relative to the elongate base member 161 by interfacing with the upper and/or lower surfaces of the slot 162.

The intermediate section 165 may extend generally upwards from an edge of the lower flange section 164, specifically, the edge of the lower flange section 164 that extends outward from the slot 162 within which the lower flange section 164 is positioned at least partially within. A length/of the intermediate section 165 may increase along a height h. The intermediate section 165 may comprise a lower curved section 167 configured to change the direction of extension from the lower flanged section 164 generally upwards and an upper curved section 167 configured to change the direction of extension from the intermediate section 165 generally lateral. The intermediate section 165 may further comprise an intermediate section aperture 168. The intermediate section apertures 168 of each sliding member 163 may be connected via a connecting member (not shown) to prevent the relative translation of one sliding member 163 along the length of the slot 162 with respect to the other sliding member 163.

The upper flange section 166 may be connected to the intermediate section 165 and extend generally outward therefrom. Specifically, an edge of the upper flange section 166 may connect to the upper curved section 167. The upper flange section 166 may be configured to facilitate the mounting of a motor thereto. In some embodiments, the upper flange section 166 may comprise a plurality of motor fastener apertures 169. The plurality of motor fastener apertures 169 may be distributed along a length of the upper flange section 166. The plurality of motor fastener apertures 169 may be configured to permit a fastener therethrough to attach a motor thereto, thereby mounting the motor to the motor mounting device 160.

In some embodiments, each sliding member 163 may be integrally formed as a single structure, i.e. the lower and upper flange sections 164, 166 and the intermediate section 165 may be formed as a single structure. In other embodiments, one or more of the lower and upper flange sections 164, 166 and the intermediate section 165 may be joined by any means or method as is known in the art, including, but not limited to, welding.

The elongate base member 161 may comprise a plurality of elongate base apertures 192. The plurality of elongate base apertures 192 may be configured to align and be coaxial with a subset of the plurality of apertures 128 of the distal platform section 126 of the platform member 120. Fasteners may be positioned through aligned apertures of the plurality of elongate base apertures 192 and the plurality of apertures 128 to fixedly attach the elongate base member 161 to the distal platform section 126.

The motor mounting device 160 may further comprise an elongate cover member 194. The elongate cover member 194 may be positioned on top of the elongate base member 161 and attached thereto. The elongate cover member 194 may comprise a plurality of elongate cover apertures 196. A subset of the plurality of elongate cover apertures 196 may be aligned and coaxial with one of the apertures of the plurality of elongate base apertures 192 and thereby permit a fastener to pass therethrough, thereby attaching the elongate cover member 194 to the elongate base member 161 and the elongate base member 161 to the distal platform section 126. In some embodiments, all of the plurality of elongate cover apertures 196 may be configured for such attachment to the elongate base member 161. In other embodiments, another subset of the plurality of elongate cover apertures 196 may be configured to attach a motor thereto, facilitating mounting of the motor to the motor mounting device 160.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A motor mount apparatus comprising:
- a mounting member configured to be fixedly attached to an external structure;
- a platform member comprising:
  - a proximal platform section comprising:
    - a proximal aperture; and
    - an indexing member aperture; and
  - a distal platform section configured to facilitate attachment of at least one of a motor or a motor mounting device thereto;
- a wheel member positioned within the proximal aperture, attached to the mounting member to prevent relative rotation therebetween, and comprising a plurality of indexing recesses; and
- an indexing member configured to:
  - pass through the indexing member aperture and be positioned within an indexing recess of the plurality of indexing recesses; and
  - selectively retract to permit rotation of the platform member about the wheel member and be positioned in another index recess of the plurality of indexing recesses.

2. The motor mount apparatus of claim 1 wherein the plurality of indexing recesses are formed in a perimeter of the wheel member.

3. The motor mount apparatus of claim 1 wherein the plurality of indexing recesses are formed in a semicircle of the wheel member.

4. The motor mount apparatus of claim 1 wherein:

the plurality of indexing recesses defines a plurality of interstitial regions between adjacent indexing recesses of the plurality of indexing recesses; and an arc length of at least one interstitial region of the plurality of interstitial regions is not equal to an arc length of another interstitial region of the plurality of interstitial regions.

5. The motor mount apparatus of claim 1 wherein:

the wheel member comprises a first plurality of fastener apertures;

the mounting member comprises a second plurality of fastener apertures configured to be radially aligned with the first plurality of fastener apertures; and the motor mount apparatus further comprises a plurality of fasteners configured to be positioned through aligned apertures of the first and second pluralities of fastener apertures, thereby fastening the wheel member to the mounting member.

6. The motor mount apparatus of claim 5 further comprising an upper member configured to be positioned above the wheel member and comprising a third plurality of fastener apertures configured to be radially aligned with the first and second pluralities of fastener apertures; wherein the plurality of fasteners are configured to be positioned through the aligned apertures of the first, second, and third pluralities of fastener apertures, thereby fastening the wheel member and the upper member to the mounting member.

7. The motor mount apparatus of claim 6 further comprising a gasket member positioned between the wheel member and the upper member.

8. The motor mount apparatus of claim 1 wherein the wheel member is configured to be reversible such that in a first orientation a first surface is positioned facing upwards and in a second orientation the first surface is positioned facing downwards.

9. The motor mount apparatus of claim 1 further comprising a gasket member positioned between the mounting member and the wheel member.

10. The motor mount apparatus of claim 1 further comprising a motor mounting device attached to the distal platform section.

11. The motor mount apparatus of claim 10 wherein the motor mounting device comprises:

an elongate base member attached to an upper surface of the distal platform section and comprising opposing slots formed along a length of elongate sides of the elongate base member; and at least two sliding members, each sliding member being positioned at least partially within one of the opposing slots and being configured to slide along the length of the elongate slot within which the sliding member is partially positioned, thereby establishing a slidable attachment between the sliding members and the elongate base member, each sliding member comprising an upper flange member configured to facilitate attachment of a motor to the motor mounting device;

wherein the slidable attachment of the at least two sliding members enables a motor mounted thereto to slide along a longitudinal axis of the motor mounting device.

12. A motor mount apparatus comprising:

a mounting member configured to be fixedly attached to an external structure;

a platform member comprising:

a proximal platform section comprising:

a proximal aperture; and an indexing member aperture; and a distal platform section configured to facilitate attachment of at least one of a motor or a motor mounting device thereto;

a wheel member positioned within the proximal aperture and attached to the mounting member so as to prevent relative rotation therebetween and comprising:

a plurality of indexing recesses formed in a perimeter of the wheel member; and a plurality of interstitial regions defined between adjacent indexing recesses of the plurality of indexing recesses, an arc length of at least one interstitial region of the plurality of interstitial regions being not equal to an arc length of another interstitial region of the plurality of interstitial regions; and an indexing member configured to:

pass through the indexing member receive aperture and be positioned within an indexing recess of the plurality of indexing recesses; and selectively retract to permit rotation of the platform member about the wheel member and be positioned in another index recess of the plurality of indexing recesses.

13. The motor mount apparatus of claim 12 wherein:

the wheel member comprises a first plurality of fastener apertures;

the mounting member comprises a second plurality of fastener apertures configured to be radially aligned with the first plurality of fastener apertures; and the motor mount apparatus further comprises a plurality of fasteners configured to be positioned through aligned apertures of the first and second pluralities of fastener apertures, thereby fastening the wheel member to the mounting member.

14. The motor mount apparatus of claim 13 further comprising an upper member configured to be positioned above the wheel member and comprising a third plurality of fastener apertures configured to be radially aligned with the first and second pluralities of fastener apertures; wherein the plurality of fasteners are configured to be positioned through the aligned apertures of the first, second, and third pluralities of fastener apertures, thereby fastening the wheel member and the upper member to the mounting member.

15. The motor mount apparatus of claim 14 further comprising a gasket member positioned between the wheel member and the upper member.

16. The motor mount apparatus of claim 12 wherein the wheel member is configured to be reversible such that in a first orientation a first surface is positioned facing upwards and in a second orientation the first surface is positioned facing downwards.

17. The motor mount apparatus of claim 12 further comprising a gasket member positioned between the mounting member and the wheel member.

18. The motor mount apparatus of claim 12 further comprising a motor mounting device attached to the distal platform section.

19. The motor mount apparatus of claim 18 wherein the motor mounting device comprises:

an elongate base member attached to an upper surface of the distal platform section and comprising opposing slots formed along a length of elongate sides of the elongate base member; and at least two sliding members, each sliding member being positioned at least partially within one of the opposing slots and being configured to slide along the length of the elongate slot within which the sliding member is partially positioned, thereby establishing a slidable attachment between the sliding members and the elongate base member, each sliding member comprising an upper flange member configured to facilitate attachment of a motor to the motor mounting device;

wherein the slidable attachment of the at least two sliding members enables a motor mounted thereto to slide along a longitudinal axis of the motor mounting device.

20. A motor mount apparatus comprising:

a mounting member configured to be fixedly attached to an external structure;

a platform member comprising:

a proximal platform section comprising:

a proximal aperture; and an indexing member aperture; and a distal platform section configured to facilitate attachment of at least one of a motor or a motor mounting device thereto;

a wheel member positioned within the proximal aperture and attached to the mounting member so as to prevent relative rotation therebetween and comprising:

a plurality of indexing recesses formed in a perimeter of a semicircle of the wheel member; and a plurality of interstitial regions defined between adjacent indexing recesses of the plurality of indexing recesses, an arc length of at least one interstitial region of the plurality of interstitial regions being not equal to an arc length of another interstitial region of the plurality of interstitial regions;

an indexing member configured to:

pass through the indexing member receive aperture and be positioned within an indexing recess of the plurality of indexing recesses; and selectively retract to permit rotation of the platform member about the wheel member and be positioned in another index recess of the plurality of indexing recesses; and a motor mounting device attached to the distal platform section.

* * * * *